Figure 1:
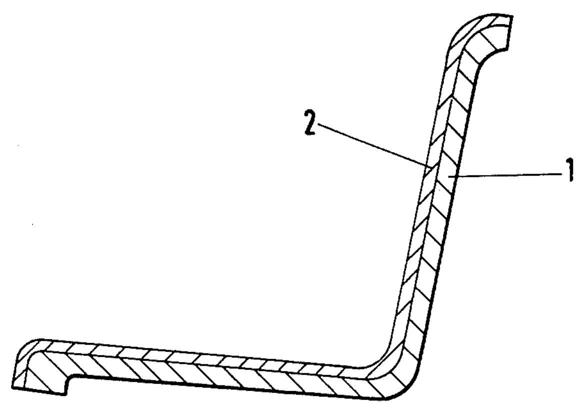

United States Patent [19]

Bramwell

[11] 4,186,235

[45] Jan. 29, 1980

[54] THERMOPLASTICS ARTICLES HAVING A SURFACE FUSED TO CLOTH

[75] Inventor: Michael J. Bramwell, Welwyn Garden City, England

[73] Assignee: Imperial Chemical Industries Limited, London, England

[21] Appl. No.: 963,051

[22] Filed: Nov. 22, 1978

Related U.S. Application Data

[63] Continuation of Ser. No. 762,161, Jan. 24, 1977, abandoned, which is a continuation of Ser. No. 679,493, Apr. 22, 1976, abandoned.

[30] Foreign Application Priority Data

Apr. 24, 1975 [GB] United Kingdom ............... 17059/75

[51] Int. Cl.[2] ............................................... B32B 27/00

[52] U.S. Cl. ..................................... 428/286; 264/257; 428/290; 428/296; 428/297; 428/310; 428/373

[58] Field of Search ......................... 156/306; 264/257; 428/286, 290, 296, 297, 310, 373

[56] References Cited

U.S. PATENT DOCUMENTS 3,511,747 5/1970 Davies .................................. 428/373

FOREIGN PATENT DOCUMENTS 1073181 6/1967 United Kingdom .

1245088 9/1971 United Kingdom .

1303961 1/1973 United Kingdom .

*Primary Examiner*—James J. Bell

*Attorney, Agent, or Firm*—Cushman, Darby & Cushman

[57] ABSTRACT

Thermoplastics articles having surfaces laminated to cloth are made without distortion of the cloth by using a melded cloth, that is to say a cloth composed of contiguous conjugate fibres fused together at points where they touch one another. The articles can be made by moulding thermoplastics materials onto melded cloth inserted into a mould.

9 Claims, 1 Drawing Figure

2

1

THERMOPLASTICS ARTICLES HAVING A SURFACE FUSED TO CLOTH

This is a continuation of Ser. No. 762,161 filed Jan. 24, 1977, now abandoned, which was a continuation of Ser. No. 679,493 filed Apr. 22, 1976, now abandoned.

This invention relates to thermoplastics articles having a surface keyed to cloth. The articles may comprise moulded thermoplastics material in a solid state or they may comprise the so-called moulded structural foams in which a foamed core is covered with a solid thermoplastics skin.

It is often impossible to make a thermoplastics article by a moulding process without producing swirl marks or other disfigurations on the surface of the resulting article. This is especially true of processes which produce structural foams. For some articles such as furniture components or components used as motor vehicle trims it is useful to stick a cloth covering onto the surface of the article to hide the disfigurations and at the same time produce an upholstered appearance. Attempts to stick cloth on to an article during the moulding process have been unsatisfactory because the thermoplastics material is usually subjected to pressures in excess of 15 $Kg/cm^2$ which causes the flow of the heat-softened thermoplastic which occurs during moulding to distort the cloth and/or penetrate through the cloth destroying its upholstered feel and creating ugly blemishes.

This invention provides a thermoplastics article having a surface region keyed into a piece of cloth which is a non-woven cloth having a thickness of at least 0.6 mms and preferably 0.8 to 4 mm and a weight of 50 to 250 $g/m^2$, preferably 80 to 150 $g/m^2$. Preferably the cloth comprises at least 25% by volume of contiguous conjugate fibres at least some of which are fused together at at least some of the points where they touch one another, each conjugate fibre comprising two mutually adhering fibre-forming components one of these which forms at least part of the surface of the fibre can be rendered fusible by a treatment which does not significantly affect the other component so as to enable contiguous fibres to be fused together. Such cloths composed of fused contiguous fibres are often referred to as "melded" cloths. Melded cloths are preferred because they are particularly resistant to removal from the thermoplastics article by pulling by hand.

Examples of melded cloths which may be used in the performance of this invention are described in United Kingdom patent specification No. 1,245,088. The melded cloths may additionally comprise fibres other than conjugate fibres such as cotton, wool, polyethylene terephthalate, nylon or polypropylene fibres. The term "fibre" is used to include not only staple fibres but also filaments and yarns in general. Preferred conjugate fibres include fibres comprising a core of nylon 66 or polyethylene terephthalate in contact with or preferably sheathed in nylon 6 or a nylon 6/nylon 66 copolymer or a polyethylene terephthalate/isophthalic copolymer. The terephthalate/isoterephthalate copolymer preferably comprises from 5 to 25% by weight of copolymerised isophthalic acid. Alternatively the conjugate fibre may comprise a core of polypropylene in contact with nylon 6 or polyethylene especially if the thermoplastics article comprises plasticised polyvinyl chloride.

This invention also includes a method for making a thermoplastics article having a surface region keyed into a piece of cloth wherein the non-woven cloth is positioned against an article-defining surface of a mould, a flowable thermoplastics material is introduced into the mould and is contacted with the cloth while under pressure and at a temperature above the softening point of the thermoplastics material. At least one component of the cloth should be capable of remaining form-stable during the process. The method is preferably performed using an injection moulding technique particularly if it is desired to produce a structural foam. In an injection moulding process, the mould is filled with molten thermoplastics material under pressure.

The method may also be performed using a blow moulding technique in which case thermoplastics material in a heat-softened state is caused to flow into contact with the non-woven cloth under the influence of the pneumatic pressure used to expand the parison.

If thermoplastics such as polyethylene or polyvinyl chloride are to be used, the method may be performed using a rotational moulding technique. For example a polyethylene powder or a polyvinyl chloride plastisol could be introduced into a rotatable mould and heated while the mould is rotated. Therefore this invention provides a method for making a thermoplastics article wherein the non-woven cloth is positioned against an article-defining surface of a rotatable mould, a powder or plastisol of thermoplastics material is introduced into the mould and then the mould is heated and rotated to rotationally mould the thermoplastics material. Alternatively thermoplastics may be keyed to the melded cloth by calendering (e.g. plasticised polyvinyl chloride) or extrusion coating (e.g. polyethylene or polypropylene) onto the melded cloth. In particular this invention provides a method for making a thermoplastics article wherein thermoplastics material is extrusion coated onto the non-woven cloth and the coated cloth is passed through nip-rollers while the thermoplastics material is still in a flowable condition.

The thermoplastics materials used in the performance of this invention are preferably crystalline polyolefins, particularly polymers or copolymers of propylene and ethylene and including copolymers of ethylene with up to 40% by weight of unsaturated esters of carboxylic acids such as vinyl acetate or alkyl acrylates and methacrylates.

The invention is illustrated by the following Examples. The melt flow index quoted in the Examples was measured according to British Standard 2782: Part 1/105C/1970 using a 2.16 kg load but carried out using a temperature of 230° C. instead of 190° C.

EXAMPLE 1

A melded cloth was made by passing a felt of contiguous conjugate fibres (each fibre consisting of a nylon 66 core enclosed in a nylon 6 sheath) through a pair of calender rollers. The upper roller was provided with heated teeth which pressed down on the felt causing the outer sheaths of contiguous compressed fibres to fuse together in the region of the compression and thus form a melded cloth. The cloth had a thickness of 1mm and a weight of 120 $g/m^2$ and was of the type normally used as curtain material. A piece of the melded cloth was then keyed onto a moulded plaque by the following process.

A plaque-defining injection mould was opened and the piece of melded cloth was laid over one of the plaque-defining surfaces of the mould and held in place by adhesive tape. The plaque defined by the mould was 6 inches by 6 inches square and 0.25 inches thick (i.e. 15.3×15.3×0.63 cm) and the piece of cloth was also 6 inches by 6 inches square. The mould was closed and filled with molten polypropylene at a temperature of 240° C. and having a melt flow index of 4.0 g/10 mins. The molten polypropylene was injected into the mould under a positive injection pressure of 700 Kg/cm². The polypropylene was allowed to cool for 2½ minutes in the mould and then the mould was opened and the plaque removed.

On inspection of the cooled plaque it appeared that the molten polypropylene had been forced into intimate contact with a surface region of the melded cloth so that on solidification of the polypropylene a plaque was formed having a surface region which conformed closely to the surface region of the cloth thus producing a keying effect which held the cloth firmly onto the plaque. Attempts to pull the cloth from the plaque by hand were unsuccessful. Despite the keying effect of the polypropylene the melded cloth retained its cloth-like feel. No evidence of distortion could be seen in the cloth and no significant relaxation of the fibres appeared to have occurred.

COMPARATIVE EXAMPLES A TO F

The procedure of Example 1 was repeated but instead of melded cloth, the following non-melded cloths were used:

A. Closely woven acrylic curtain cloth: It was discovered that when this cloth was used, molten polypropylene readily penetrated the cloth and covered parts of the visible surface of the cloth (i.e. that surface which is not keyed to the thermoplastics article and which is visible when the article is in use). Even where the visible surface of the cloth had not been covered, sufficient penetration of the cloth by polypropylene had occurred to cause the cloth to lose its textile feel. The cloth had been badly distorted by the flow of the molten polypropylene.

B. Closely woven nylon upholstery cloth provided with a woven backing composed of nylon and cotton fibres: It was discovered that penetration of this cloth by the polypropylene was not excessive and in particular it did not lose its textile feel. However the cloth could be easily pulled from the plaque by hand.

C. Upholstery cloth made from polypropylene fibres: It was discovered that the polypropylene fibres partially fused with the molten polypropylene and although the pattern remained intact the textile feel was lost.

D. Closely woven linen curtain cloth: It was discovered that the molten polypropylene had penetrated the cloth as in comparative Example A but in this case the cloth was even more badly distorted.

E. Closely woven cotton curtain material: It was discovered that the molten polypropylene would not flow easily over the surface of the cotton cloth and as a result it was impossible to fill the mould using the conventional pressures employed in Example 1. The cotton cloth could also be pulled from the plaque by hand.

F. Closely woven woolen upholstery material: It was discovered that the molten polypropylene would not flow easily over the surface of the woolen cloth and as in comparative Example F it was impossible to fill the mould using the pressure used in Example 1. Increasing the pressure in order to fill the mould caused excessive penetration of the woolen cloth and destroyed its textile feel.

EXAMPLE 2

A length of melded cloth of the kind used in Example 1 was extrusion coated with a layer of polypropylene using a standard extrusion coating technique. The polypropylene had a melt flow index of 5 and contained 2.5% by weight of carbon black. The coated cloth was passed through nip rollers while the polypropylene was still in a flowable condition. On cooling it was discovered that the polypropylene had keyed firmly to the melded cloth.

Preferably the thermoplastics used in the performance of this invention should be moulded at from 200° to 300° C. and at pressures of 20 to 1,000 Kg/cm². Injection moulding is usually carried out at 200° to 250° C. using pressures of 500 to 1,000 Kg/cm².

Preferably the polypropylene used in the performance of this invention should have a melt flow index of from 0.1 to 30 g/10 minutes and in particular the melt flow index usually lies in the range 1 to 10 g/10 minutes.

In a modification of this invention particularly desirable when the thermoplastics articles are articles of furniture, melded cloth is used which contains a flame retardant additive or additive combination or which has been subjected to a flame retardant treatment.

An embodiment of the invention will now be described with reference to the drawing which shows a vertical section through a chair component made according to this invention. The FIGURE shows a thermoplastics chair component 1 fused to a melded cloth covering 2.

I claim:

1. A thermoplastics article having a surface fused to a cloth wherein the cloth comprises at least 25% by volume of contiguous conjugate fibres at least some of which are fused together at at least some of the points where they touch one another, each conjugate fibre comprising two mutually adhering fibre-forming components one of these which forms at least part of the surface of the fibre can be rendered fusible by a treatment which does not significantly affect the other component so as to enable contiguous fibres to be fused together.

2. A thermoplastics article as claimed in claim 1 wherein the cloth comprises conjugate fibres comprising a core of nylon 66 or polyethylene terephthalate in contact with or sheathed in nylon 6 or a nylon 6/nylon 66 copolymer or a polyethylene terephthalate/isophthalate copolymer.

3. A thermoplastics article according to claim 2 wherein the cloth comprises conjugate fibres comprising a core of nylon 66 enclosed within a sheath of nylon 6.

4. A thermoplastics article according to claim 2 wherein the cloth comprises conjugate fibres comprising a core of polyethylene terephthalate in contact with or enclosed within a polyethylene terephthalate/isophthalate copolymer.

5. A thermoplastics article according to claim 1 wherein the thermoplastics material comprises a crystalline polyolefin.

6. A thermoplastics article according to claim 5 wherein the polyolefin is a polymer of propylene or a copolymer of propylene and ethylene.

7. A thermoplastics article according to claim 6 wherein the thermoplastics material is in the form of a structural foam.

8. A thermoplastics article according to claim 1 wherein the article is a furniture component.

9. A thermoplastics article according to claim 1 wherein the article is a trim for a motor vehicle.

* * * * *